(12) United States Patent
Deshpande et al.

(10) Patent No.: US 10,346,089 B2
(45) Date of Patent: Jul. 9, 2019

(54) DATA PROCESSING SYSTEM HAVING A WRITE REQUEST NETWORK AND A WRITE DATA NETWORK

(71) Applicant: FREESCALE SEMICONDUCTOR, INC., Austin, TX (US)

(72) Inventors: Sanjay R. Deshpande, Austin, TX (US); John E. Larson, Round Rock, TX (US)

(73) Assignee: NXP USA, Inc., Austin, TX (US)

( * ) Notice: Subject to any disclaimer, the term of this patent is extended or adjusted under 35 U.S.C. 154(b) by 68 days.

(21) Appl. No.: 15/053,248

(22) Filed: Feb. 25, 2016

(65) Prior Publication Data

US 2017/0249103 A1 Aug. 31, 2017

(51) Int. Cl.
G06F 12/00 (2006.01)
G06F 3/06 (2006.01)
G06F 13/40 (2006.01)

(52) U.S. Cl.
CPC ............ G06F 3/0659 (2013.01); G06F 3/067 (2013.01); G06F 3/0611 (2013.01); G06F 13/4022 (2013.01)

(58) Field of Classification Search
CPC .. G06F 13/4022; G06F 3/0659; G06F 3/0611; G06F 3/067; G06F 5/10; G06F 5/14; H04L 47/50
See application file for complete search history.

(56) References Cited

U.S. PATENT DOCUMENTS

| 5,546,546 | A | 8/1996 | Bell et al. |
| 5,930,485 | A | 7/1999 | Kelly |
| 5,933,612 | A | 8/1999 | Kelly et al. |
| 7,853,716 | B1* | 12/2010 | Baxter, III ............ H04L 49/205 709/240 |
| 2005/0135355 | A1* | 6/2005 | Muthukrishnan ..... H04L 49/254 370/389 |
| 2005/0135356 | A1* | 6/2005 | Muthukrishnan ....... H04L 47/30 370/389 |
| 2006/0259671 | A1* | 11/2006 | Swartzentruber ... G06F 13/4022 710/104 |

OTHER PUBLICATIONS

King, "Packet Sniffing in a Switched Environment", SANS Institute, Jul. 2006, all.*

(Continued)

*Primary Examiner* — Arvind Talukdar

(57) ABSTRACT

A data processing system includes a plurality of switch points interconnected by a write data network and a write request network. Each switch point includes write request switch circuitry having write request ingress ports and write request egress ports coupled to the write request network and arbitration circuitry configured to grant a write request received at one of the write request ingress ports access to one of the write request egress ports. Each switch point also includes write data switch circuitry having write data ingress ports and write data egress ports coupled to the write data network. In response to the write request arbitration circuitry granting the write request, allowing write data from the write data ingress port corresponding to the one of the write request ingress ports to be provided at the write data egress port which corresponds to the one of the write request egress ports.

15 Claims, 2 Drawing Sheets

(56) References Cited

OTHER PUBLICATIONS

"BPX 8600 Architecture and Performance", Cisco, 2009.*
Dimitrakopoulos et al. "Fast Arbiters for On-Chip Network Switches", IEEE, 2008.*
Ferro, "Switch Fabrics: Fabric Arbitration and Buffers", Ethereal Mind 2011.*
Gunther, Klaus D. "Prevention of Deadlocks in Packet-Switched Data Transport Systems", IEEE Transactions on Communications, vol. Com-29, No. 4, Apr. 1981, pp. 512-524.

* cited by examiner

DATA PROCESSING SYSTEM HAVING A WRITE REQUEST NETWORK AND A WRITE DATA NETWORK

BACKGROUND

Field

This disclosure relates generally to data processing systems, and more specifically, to data processing systems with a write request network and a write data network.

Related Art

A data processing system may be configured as having a plurality of nodes interconnected by a plurality of networks. Each of these nodes includes a switch point for routing signals between nodes along the networks and may include any type of device, such as a processing unit or memory. In the case of a data processing system with a shared memory, which is accessible by multiple nodes of the system, address and data portions of read and write accesses often travel independently on separate networks (i.e. on separate sets of wires). Access requests (corresponding to the address portion of an access) travel from requestor nodes to target nodes, in which the target nodes include a target memory. For a read request, read data travels from the target node to the requestor node, and for a write request, write data travels from the requestor node to the target node. In the case of multiple concurrent accesses traveling along the networks, the data processing system is vulnerable to deadlock scenarios. This may occur when the progress of write requests and write data through the networks become uncoordinated.

In one solution to avoid deadlocks, a write request is first sent to a target node. A data grant is then sent back to the requester node before the data is allowed to transfer out of the requester node towards the target node. For each write request that is granted by the target node, the target node reserves buffer resource to receive the data. The write data of the granted writes is then accepted as they arrive to the target. However, while this may avoid deadlocks, this increases latency in large systems. For example, if the target node is far from the requester node, the round trip latency from write request to write data delivery is large. Furthermore, since the requester has limited buffer resource to hold the write data, large latencies can lead to requester stalls for the write accesses. Therefore, a need exists for improved writes in shared memory systems.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

A data processing system includes a plurality of switch points interconnected by a write request network and a write data network. In one embodiment, each write request ingress port of a switch point corresponds to a particular write data ingress port of the switch point, and each write request egress port of a switch point corresponds to a particular write data egress port of the switch point. Upon a switch point granting access to a write request received at a write request ingress port to a particular write request egress port, a data grant is immediately issued for the corresponding write data. The write data corresponding to the granted write request is then allowed to be provided to the write data egress port which corresponds to the particular write request egress port. In this manner, the write data need not wait upon a data grant from a target device before proceeding to the next switch point. Furthermore, the write request and write data are transmitted along the same path of switch points and in the same order between the requestor and target.

Figure 1:
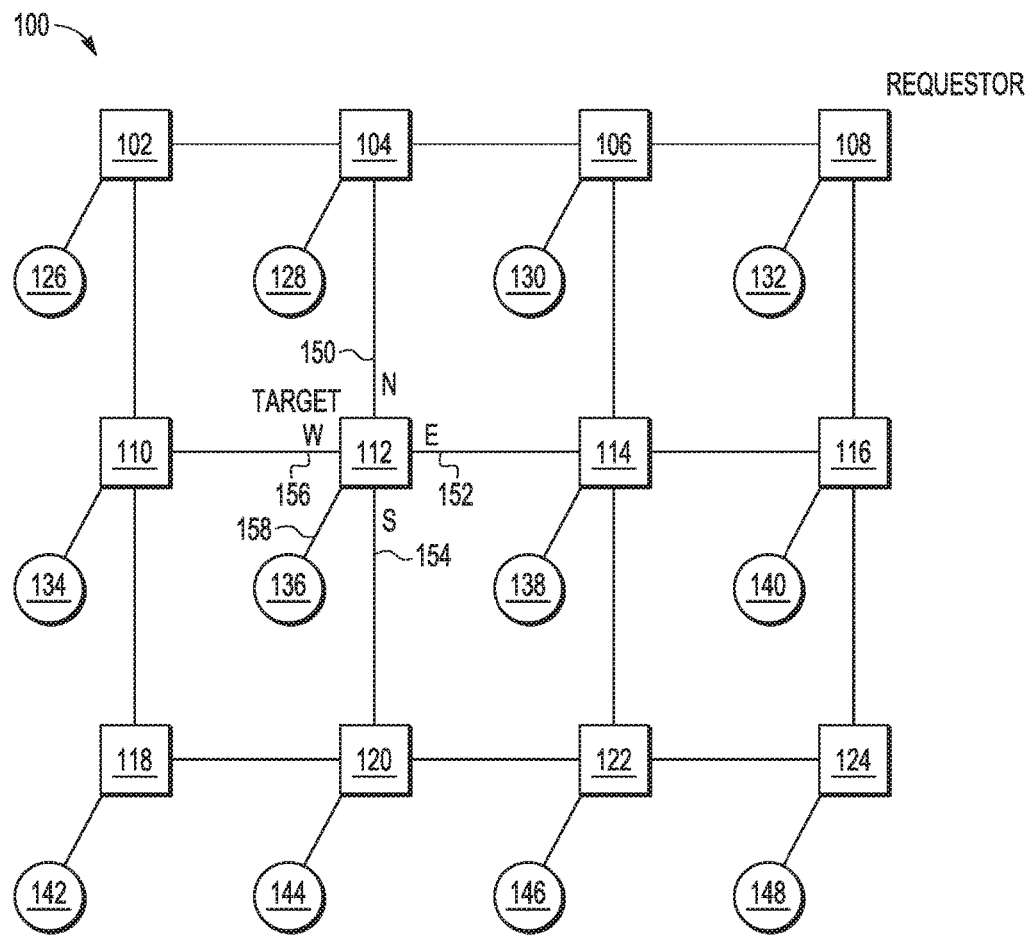
FIG. 1 illustrates, in block diagram form, a data processing system in accordance with one embodiment of the present invention.

FIG. 1 illustrates a data processing system 100 having a plurality of interconnected switch points 102, 104, 106, 108, 110, 112, 114, 116, 118, 120, 122, and 124. Each switch point is connected to its adjacent neighboring switch points by a plurality of networks. In the illustrated embodiment, the switch points are interconnected as a mesh in an array configuration. However, alternatively, the switch points can be connected in other configurations. In one embodiment, the plurality of networks includes a write request network and a write data network, in which the write request network communicates write requests (such as the address portion of a write access) and the write data network communicates write data. Each network may be implemented as a separate set of wires which provides a connection between switch points. Each switch point may be coupled to a corresponding device. For example, switch point 102 is coupled to device 126, switch point 104 is coupled to device 128, switch point 106 is coupled to device 130, switch point 108 is coupled to device 132, switch point 110 is coupled to device 134, switch point 112 is coupled to device 136, switch point 114 is coupled to device 138, switch point 116 is coupled to device 140, switch point 118 is coupled to device 142, switch point 120 is coupled to device 144, switch point 122 is coupled to device 146, and switch point 124 is coupled to device 148. Each switch point and corresponding device may be referred to as a node, and data processing system 100 may include any number of nodes. Furthermore, a switch point may not have a corresponding device. In this case, the node only includes a switch point. The corresponding devices can be any type of devices, such as any type of processing unit or any type of memory.

Each switch point in FIG. 1 includes up to 5 ingress ports and up to 5 egress ports. An ingress port receives information from a network and an egress port provides information to a network. Switch points 112 and 114 each includes 5 ingress ports and 5 egress ports so it may communicate with each of the 4 neighboring switch points as well as its corresponding device. Therefore, using switch point 114 as an example, switch point 114 includes a north port 150 which allows communication with switch point 104, a south port 154 which allows communication with switch point 120, an east port 152 which allows communication with switch point 114, a west port 156 which allows communication with switch point 110, and a local port 158 which allows communication with its corresponding device, device 136. Each port may include an ingress port and an egress port for each network of system 100. For example, port 150 includes a write request ingress port and a write request egress port to communicate with the write request network, and a write data ingress port and a write data egress port to communicate with the write data network. Port 150 may also include additional ingress and egress ports to communicate with other networks of system 100. Similarly, ports 152, 154, and 156 each include a write request ingress port, a write request egress port, a write data ingress port, and a write data egress port, and may further include additional ingress and egress ports to communicate with other networks of system 100. Port 158 is the local port which allows for communication between processing device 136 and switch point 112. Port 158 also includes an ingress port to receive information from device 136 and an egress port to provide information to device 136. In this manner, write requests and write data from device 136 may be provided to any other node in system 100 through switch point 112. The write request and write data then travel to the destination node by traversing the write request network and write data network, respectively, through neighboring switch points.

Other switch points in system 100 may include a local port, such as local port 158, if it is coupled to a corresponding device, and may include two or more other ports, as needed, to communicate with neighboring switch points. For example, switch point 104 includes a west port similar to west port 156, a south port similar to south port 154, an east port similar to east port 152, and a local port similar to local port 158. Switch point 104 does not include a north port since it has no neighbor to its north direction. Switch point 108 includes a west port similar to west port 156, a south port similar to south port 154, and a local port similar to local port 132. Switch point 108 does not include a north port or an east port. In the illustrated embodiment, switch point 108 may be referred to as a requestor switch point in which device 132, which may be any processing device, may request access to a target device, such as target device 136 corresponding to target switch point 150. Note that target switch point 150 and target device 136 may be referred to as the target node. In the case of a write access, a write request is transmitted on the write request network from requesting device 132 to target device 136 through a path of connected switch points. This path may include switch point 108, switch point 106, switch point 104, and switch point 112, or, alternatively, this path may include switch point 108, switch point 116, switch point 114, and switch point 112. In yet other alternate embodiments, any path of connected switch points may be used to transmit the write request from the requestor to the target. Similarly, in the case of a write access, the write data is transmitted on the write data network from the requesting device 132 to the target device 136 through the same path of connected switch points used to communicate the write request of the write access.

Note that switch points in the path between the requester and target may be referred to as intermediate switch points. Also, a particular switch point may include a different number of ingress ports and egress ports for a particular network. The terms "north," "south," "east," "west," in the description are used for descriptive purposes and not necessarily for describing permanent relative positions. That is, the switch points can be in a variety of different configurations, other than in an array configuration, and neighboring switch points may not be physically located north, south, east, or west of a switch point.

Figure 2:
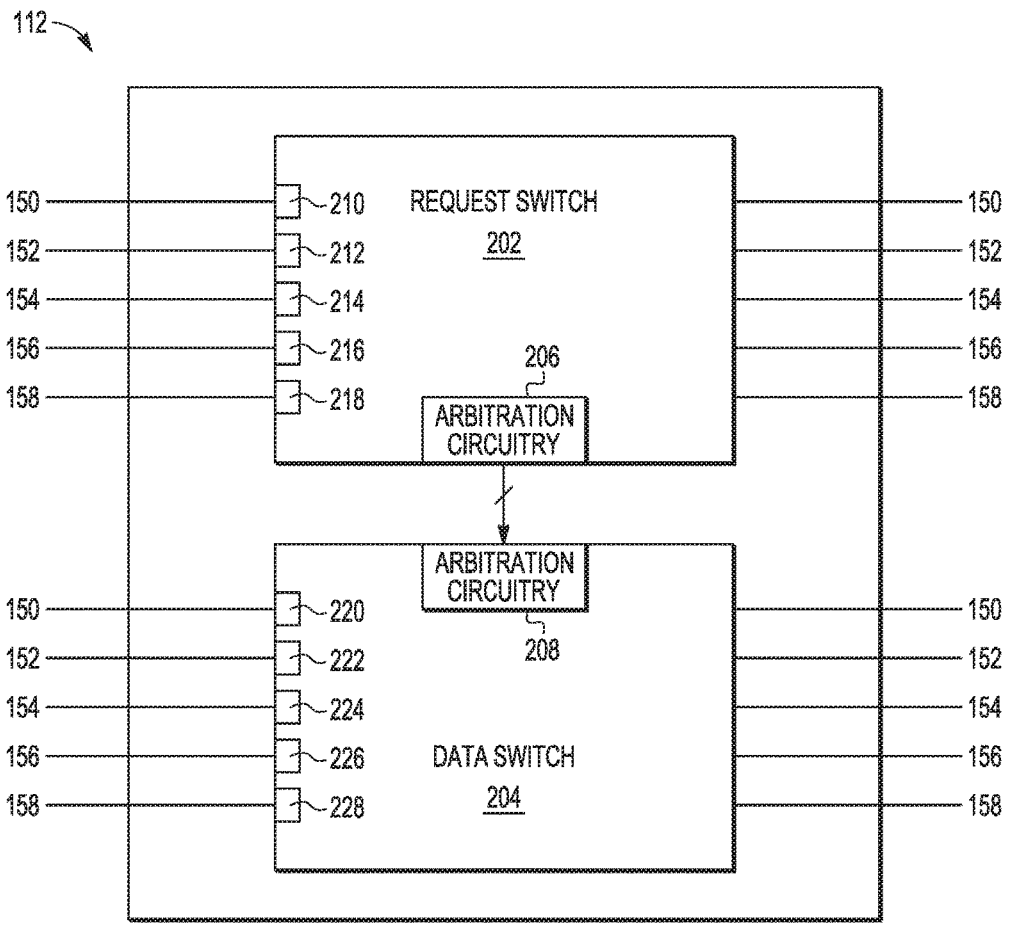
FIG. 2 illustrates, in block diagram form, a switch point of the data processing system of FIG. 1 in accordance with one embodiment of the present invention.

FIG. 2 illustrates, in block diagram form, further details of switch point 112 of FIG. 1. Switch point 112 includes a write request switch 202 coupled to the write request network of system 100, and a write data switch 204 coupled to the write data network of system 100. The ingress ports are illustrated on the left side of switches 202 and 204 and the egress ports are illustrated on the right side of switches 202 and 204. Each write request ingress port coupled to request switch 202 corresponds to one write data ingress port coupled to request switch 204, and each write request egress port coupled to request switch 202 corresponds to one write data egress port coupled to data switch 204. For example, the write request ingress and egress ports and write data ingress and egress ports of port 150 correspond to each other, respectively, the write request ingress and egress ports and write data ingress and egress ports of port 152 correspond to each other, respectively, the write request ingress and egress ports and write data ingress and egress ports of port 154 correspond to each other, respectively, the write request ingress and egress ports and write data ingress and egress ports of port 156 correspond to each other, respectively, and the write request ingress and egress ports and write data ingress and egress ports of port 158 correspond to each other.

Request switch 202 includes storage circuitry 210, 212, 214, 216, and 218 at each write request ingress port of corresponding ports 150, 152, 154, 156, and 158. Data switch 204 includes storage circuitry 220, 222, 224, 226, and 228 at each write data ingress port of corresponding ports 150, 152, 154, 156, and 158. In one embodiment, each storage circuitry is implemented as a first-in first-out queue (FIFO) in which a new entry is placed into the tail of the queue and an oldest entry is output first from the head of the queue. Each storage circuitry may therefore be referred to as a FIFO.

Request switch 202 includes arbitration circuitry 206 and data switch 204 includes arbitration circuitry 208. Arbitration circuitry 206 is coupled to arbitration circuitry 208. In one embodiment, each write request egress port in request switch 202 is coupled to the output of a multiplexer (or other selection logic) which provides, at its output, the oldest entry of the FIFO corresponding to a selected write request ingress port. The selected write request ingress port is determined by the arbitration scheme implemented by arbitration circuitry 206. Therefore, in this embodiment, each multiplexer in switch 202 is coupled to the head of each FIFO of switch 202, and outputs of arbitration circuitry 206 controls the multiplexers to allow an oldest entry of the FIFO of the selected write request ingress port to be provided to the appropriate write request egress port.

Similarly, each write data egress port in data switch 204 may be coupled to the output of a multiplexer (or other selection logic) which provides, at its output, the oldest entry of the FIFO corresponding to a selected write data ingress port. The selected write data ingress port is determined by arbitration circuitry 208 to be the write data ingress port which corresponds to the selected write request ingress port as determined by arbitration circuitry 206. Therefore, arbitration circuitry 206 provides information with respect to a selected write request ingress port to arbitration circuitry 208. In this embodiment, each multiplexer in switch 204 is coupled to the head of each FIFO, and outputs of arbitration circuitry 208 controls the multiplexers to allow the oldest entry of the FIFO of the write data ingress port corresponding to the selected write request ingress port to be provided to the write data egress port corresponding to the appropriate write request egress port. In alternate embodiments, other circuitry, other than multiplexers, may be used within switches 202 and 204 to route write requests and data, respectively, from a selected ingress port of the switch to an appropriate egress port of the switch.

Arbitration circuitry 206 of request switch 202 selects a write request ingress port by determining which write request ingress port having a pending write request is granted access to transmit its write request to a write request egress port. Arbitration circuitry 206 may make this determination based on any arbitration scheme, such as by granting access to the oldest pending write request among the oldest entries in the FIFOs. Alternatively, a round robin arbitration scheme may be used or a weighted arbitration scheme. Upon making a determination to grant access to a write request ingress port, the write request is provided to the appropriate write request egress port, based on the write address of the request or based on an alternative egress port indication accompanying the request. If device 136 is not the target device, the write request is provided via the write request network to a next neighboring switch point by way of the appropriate write request egress port of ports 150, 152, 154, and 156, and if device 136 is the target device, the write request is provided to device 136 by way of the write request egress port of local port 158.

Upon granting access to a write request to be transmitted to a write request egress port, arbitration circuitry 206 communicates this grant to arbitration circuitry 208, which immediately grants access to the write data corresponding to the granted write request. After granting access to a write request, the write data from the write data ingress port corresponding to the write request ingress port which was granted access can be provided to the write data egress port which corresponds to the write request egress port which received the granted write request. In this manner, the write data follows the same path of switch points on the write data network as the write request follows on the write request network.

Since each write data ingress port and write data egress port corresponds to a particular write request ingress port and write request egress port, arbitration circuitry 206 of request switch 202 controls arbitration of both the write requests and corresponding write data. Since a grant of a write request results in an immediate grant of the corresponding write data, a switch point need not wait for a data grant signal to be received before transferring the write data to a next switch point. This may allow for reduced latencies since a data grant signal need not travel from the target back to the switch point for the data to proceed along its path. In one embodiment, the data grant for the write data is stored in an output queue for the appropriate write data egress port. In this manner, the write data will be provided to the appropriate write data egress port in the same order as the write requests. Therefore, even if the write data is provided at a write data egress port at a later time than the write request is provided at a write request egress port, the correct order is maintained.

By now it can be understood how latencies may be reduced and deadlocks avoided by correlating write request ingress/egress ports with write data ingress/egress ports and having each switch point, upon granting access to a write request to a particular write request egress port, immediately grant access to the corresponding write data to the write data egress port corresponding to the particular write request egress port. The write request and write data can therefore be transmitted along the same path of switch points and in the same order between the requestor and target, and the write data need not wait upon a data grant from a target device before proceeding to the next switch point.

The networks as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "de-assert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by a bar over the signal name or an asterisk (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Also for example, in one embodiment, the illustrated elements of system 100 are circuitry located on a single integrated circuit or within a same device. Alternatively, system 10 may include any number of separate integrated circuits or separate devices interconnected with each other. Furthermore, system 100 may include additional elements, such as additional memories or other peripherals.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. For example, the fabric of interconnected switch points of system 100 may have different configurations or topologies. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

Below are various embodiments of the present invention.

In one embodiment, a data processing system includes a plurality of switch points interconnected by a write data network and a write request network, wherein each switch point includes: write request switch circuitry having a plurality of write request ingress ports coupled to the write request network, a plurality of write request egress ports coupled to the write request network, and write request arbitration circuitry configured to grant a write request received at one of the plurality of write request ingress ports access to one of the plurality of write request egress ports indicated by the write request; and write data switch circuitry having a plurality of write data ingress ports coupled to the write data network in which each write data ingress port uniquely corresponds to a write request ingress port, a plurality of write data egress ports coupled to the write data network in which each write data egress port uniquely corresponds to a write request egress port, and write data arbitration circuitry configured to, in response to the write request arbitration circuitry granting the write request, allowing write data from the write data ingress port which corresponds to the one of the plurality of write request ingress ports to be provided at the write data egress port which corresponds to the one of the plurality of write request egress ports. In one aspect, in each switch point, the write request switch circuitry further comprises storage circuitry at each write request ingress port configured to store received write requests. In a further aspect, in each switch point, the storage circuitry at each write request ingress port is a first-in-first-out (FIFO) queue, wherein the write request storage arbitration circuitry is configured to select the write request from an oldest entry of the FIFO queue at the one of the plurality of write request ingress ports. In another further aspect, in each switch point, the write data switch circuitry further comprises storage circuitry at each write data ingress port configured to store received write data. In another aspect, in each switch point, write requests are received in an order at each write request ingress port and are granted from each write request ingress port by the write request arbitration circuitry in the order received. In another aspect, a first switch point of the plurality of switch points is coupled to a processing unit which generates a write request which is transmitted through one or more switch points of the plurality of switch points to a target switch point. In a further aspect, write data for the write request is transmitted through the one or more switch points to the target switch point. In yet a further aspect, the write data is transmitted with the write request without receiving a grant signal from the target switch point.

In another embodiment, a data processing system includes a requester switch point including a local port coupled to a processing unit, a write request egress port coupled to a write request network and a write data egress port coupled to a write data network, the requestor switch point configured to output a write request from the processing unit to the write request network and write data from the processing unit to the write data network; a target switch point coupled to the write request network and the write data network; and one or more intermediate switch points coupled to the write request network and the write data network, between the requestor switch point and target switch point, and configured to transmit the write request and write data from the requestor switch point to the target switch point, wherein upon each of the one or more intermediate switch points granting the write request access to a write request egress port of the intermediate switch point, the intermediate switch point grants the write data access to a write data egress port of the intermediate switch point which corresponds to the write request egress port of the intermediate switch point. In one aspect, each of the one or more intermediate switch points includes a first number of write request ingress ports and a second number of write request egress ports coupled to the write request network; and a first number of write data ingress ports and a second number of write data egress ports coupled to the write data network. In a further aspect, each of the first number of write data ingress ports uniquely corresponds to a write request ingress port of the first number of write request ingress ports, and each of the second number of write data egress ports uniquely corresponds to a write request egress port of the second number of write request egress ports. In yet a further aspect, each of the one or more intermediate switch points includes write request arbitration circuitry configured to, for each of the second number of write request egress ports, grant access of a selected write request received at one of the first number of write request ingress ports to the write request egress port. In yet a further aspect, within each of the one or more intermediate switch points, write requests at each of the first number of write request ingress ports are granted by the write request arbitration circuitry in a same order as received at the write request ingress port. In another yet further aspect, each of the one or more intermediate switch points comprises write data arbitration circuitry configured to: in response to the write request arbitration circuitry granting access to a selected write request, provide corresponding write data received at a write data ingress port corresponding to a write request ingress port which received the selected write request to one of the second number of write data egress ports which corresponds to one of the second number of write request egress ports which corresponds to one of the second number of write request egress portions which output the selected write request. In another aspect, the requester switch point is configured to provide the write data for the write request to an adjacent switch point of the one or more intermediate switch points without requiring a write data grant signal from the target switch point.

In yet another embodiment, in a data processing system having a plurality of switch points interconnected by a write request network and a write data network, each switch point having write request ingress ports and write request egress ports coupled to the write request network, and write data ingress ports and write data egress points coupled to the write data network, a method includes receiving write requests from the write request network at a first number of write request ingress ports and write data from the write data network at the first number of write data ingress ports; at each of a second number of write request egress ports, arbitrating among received write requests indicating the write request egress port to grant access to a selected write request to the corresponding write request egress port; providing the selected write requests to the write request network via the corresponding write egress ports; and in response to granting access to a selected write request to a corresponding write request egress port, routing write data received at a write data ingress port corresponding to the write request ingress port which received the selected write request data to a write data egress port corresponding to the write request egress port which provided the selected write request to the write request network. In one aspect, the selected write request is provided to the write request network prior to the write data being provided to the write data network. In another aspect, the receiving the write requests, arbitrating among received write requests, providing the selected write requests, and routing write data is performed at each switch point of the plurality of switch points. In another aspect, the method further includes at each of the first number of write request ingress ports, storing received write requests in a first-in first-out queue, wherein the arbitrating among the received write requests at each of the second number of write request egress ports comprises arbitrating among oldest write requests indicating the write request egress port. In another aspect, routing the write data corresponding to the write request is performed without requiring a data grant signal from a target switch point of the write request.

What is claimed is:

1. A data processing system, comprising:
a device configured to send a write request and a write data;
requester switch point coupled to the device, the requester switch point further comprises:
a write request switch circuitry having a plurality of write request ingress ports that includes a request switch—first-in-first-out (FIFO) at each write request ingress port to store a write request, and a write request arbitration circuitry configured to grant the write request received at one of the plurality of write request ingress ports access to one of write request egress ports indicated by the write request;
a write data switch circuitry having a plurality of write data ingress ports that includes a write data switch—FIFO at each write data ingress port to store a received write data, and write data arbitration circuitry configured to, in response to the write request arbitration circuitry granting the write request, allowing corresponding stored write data to be provided at a write data egress port, which corresponds to the one of the write request egress ports,
wherein the write data is transmitted to a target switch point without sending a grant signal by the target switch point to the requestor switch point or to the device, wherein the write request and the write data are transmitted along a same path and same order between the requestor switch point and the target switch point; and
a target device coupled to the target switch point wherein the target device receives the write request and the write data without sending the grant signal to the device through the target switch point and the requester switch point.

2. The data processing system of claim 1, wherein, the write data arbitration circuitry immediately issues data grant that corresponds to the ranted write request.

3. The data processing system of claim 2, wherein, the write request storage arbitration circuitry is configured to select the write request from an oldest entry of the FIFO at the one of the plurality of write request ingress ports.

4. The data processing system of claim 2, wherein, in each switch point, the write data switch—FIFO is configured to store received write data.

5. The data processing system of claim 1, wherein, in each switch point, write requests are received in an order at each write request ingress port and are granted from each write request ingress port by the write request arbitration circuitry in the order received.

6. A data processing system comprising:
a requester switch point configured to facilitate sending of a write request and a write data from a requesting device, the requester switch point further comprises: a write request arbitration circuitry that grants the write request; and a write data arbitration circuitry that immediately issues data grant in response to the granted write request;
a target switch point coupled to the requester switch point, wherein the write data is transmitted to the target switch point without sending a grant signal by the target switch point to the requestor switch point, wherein the write data is transmitted along a same path of switch points and in the same order between the requestor switch point and the target switch point; and
a target device coupled to the target switch point, wherein the target device receives the write request and the write data without sending the grant signal to the target switch point and the requester switch point.

7. The data processing system of claim 6, wherein the requester switch point comprises:
a first number of write request ingress ports and a second number of write request egress ports; and
a first number of write data ingress ports and a second number of write data egress ports.

8. The data processing system of claim 7, wherein each of the first number of write data ingress ports uniquely corresponds to a write request ingress port of the first number of write request ingress ports, and each of the second number of write data egress ports uniquely corresponds to a write request egress port of the second number of write request egress ports.

9. The data processing system of claim 8, wherein each of the write data ingress ports comprises a first-in-first-out (FIFO) that stores the received write data.

10. The data processing system of claim 9, wherein the write requests at each of the first number of write request ingress ports are granted by the write request arbitration circuitry in a same order as received at the write request ingress port.

11. The data processing system of claim 9, wherein the requester or target switch point comprises the write data arbitration circuitry configured to:

in response to the write request arbitration circuitry granting access to a selected write request, provide corresponding write data received at a write data ingress port corresponding to the write request ingress port which received the selected write request to one of the second number of write data egress ports which corresponds to one of the second number of write request egress ports which corresponds to one of the second number of write request egress portions which output the selected write request.

12. In a data processing system having a plurality of switch points, each switch point having write request ingress ports and write request egress ports, and write data ingress ports and write data egress ports, a method comprising:
- receiving write requests through a first number of write request ingress ports and write data through a first number of write data ingress ports;
- at each of a second number of write request egress ports, arbitrating among received write requests indicating the write request egress port to grant access to a selected write request to the corresponding write request egress port;
- providing the selected write requests to the corresponding write egress ports; and
- in response to granting access to a selected write request to a corresponding write request egress port, routing write data received at a write data ingress port corresponding to the write request ingress port which received the selected write request data to a write data egress port corresponding to the write request egress port which provided the selected write request to the write request network,
- wherein a routing of the write request and the write data to another switch point is through a same path and order, wherein a transmission of the write request and the write data is performed without sending a data grant signal by the other switch point to the requester switch point.

13. The method of claim 12, wherein the selected write request is granted based on the order received.

14. The method of claim 12, wherein the receiving the write requests, arbitrating among received write requests, providing the selected write requests, and routing write data is performed at each switch point of the plurality of switch points.

15. The method of claim 12, further comprising:
- at each of the first number of write request ingress ports, storing received write requests in a first-in first-out queue, wherein the arbitrating among the received write requests at each of the second number of write request egress ports comprises arbitrating among oldest write requests indicating the write request egress port.

* * * * *